United States Patent
French et al.

(10) Patent No.: US 6,664,302 B2
(45) Date of Patent: Dec. 16, 2003

(54) METHOD OF FORMING A FEED FOR COAL GASIFICATION

(75) Inventors: Robert French, Wellington, CO (US); Robert A. Reeves, Arvada, CO (US); Charles B. Benham, Littleton, CO (US)

(73) Assignee: GTL Energy, Wellington, CO (US)

( * ) Notice: Subject to any disclaimer, the term of this patent is extended or adjusted under 35 U.S.C. 154(b) by 62 days.

(21) Appl. No.: 10/121,972

(22) Filed: Apr. 12, 2002

(65) Prior Publication Data

US 2003/0192235 A1 Oct. 16, 2003

(51) Int. Cl.⁷ .............. C07C 27/00; C07C 1/02; C10J 3/00; F02G 3/00
(52) U.S. Cl. .............. 518/700; 252/373; 48/210; 60/39.02
(58) Field of Search .............. 518/700; 252/373; 48/210; 60/39.02

(56) References Cited

U.S. PATENT DOCUMENTS

| | | | |
|---|---|---|---|
| 3,996,026 A | 12/1976 | Cole | 48/197 |
| 4,214,875 A | 7/1980 | Kromrey | 44/6 |
| 4,331,445 A | 5/1982 | Burns | 44/6 |
| 4,331,446 A | 5/1982 | Draper et al. | 44/24 |
| 4,389,216 A | 6/1983 | Bergmann et al. | 44/6 |
| 4,389,218 A | 6/1983 | Pike | 44/6 |
| 4,417,902 A | 11/1983 | Yaghmaie et al. | 44/51 |
| 4,670,058 A | 6/1987 | Mark | 106/283 |
| 4,783,198 A | 11/1988 | Hueschen | 44/51 |
| 4,904,277 A | 2/1990 | Najjar et al. | 44/51 |
| 5,033,230 A | 7/1991 | Kennepohl et al. | 44/502 |
| 5,071,447 A | 12/1991 | Koppelman | 44/621 |
| 5,324,336 A | 6/1994 | Child | 44/608 |
| 5,815,946 A | 10/1998 | Dean | 34/340 |
| 6,068,760 A | 5/2000 | Benham et al. | 208/950 |
| 6,313,361 B1 | 11/2001 | Waycuilis | 565/314 |

*Primary Examiner*—J. Parsa
(74) *Attorney, Agent, or Firm*—Sheridan Ross P.C.

(57) ABSTRACT

The invention provides a method by which low-rank coal may be processed to provide a high-energy feedstock for coal gasification and synthesis gas production. Preliminary coal preparation, which may include washing and drying, is followed by wax-impregnation to produce a high-energy, low-moisture, stable feedstock. The wax is preferably obtained from an on-site Fischer-Tropsch reactor that also produces diesel fuel and naptha.

24 Claims, 3 Drawing Sheets

METHOD OF FORMING A FEED FOR COAL GASIFICATION

FIELD OF THE INVENTION

The invention relates to improved methods of forming a feedstock, comprising a wax-impregnated coal, for coal gasification.

BACKGROUND OF THE INVENTION

The gasification of solid fuels such as coal is well known. Several methods have been proposed for feeding the coal into the gasifier. In one method, the coal is ground to a fine powder and fed to the gas generator as a suspension in steam or a free oxygen-containing gas. This method is unsatisfactory as it is difficult to control the amount and rate of the coal fed to the gas generator and, in the case of a free oxygen-containing gas, care must be taken to maintain the velocity of the suspension above the rate of flame propagation to avoid a dangerous and damaging backflash.

Newer methods have been developed to overcome the drawbacks of the dry, ground coal feedstock. One method is the production of a coal-water slurry in which the coal is ground to a particle size, mixed in water or organic liquids, and injected into the gasifier. The coal is ground to a fine particle size to ensure that almost complete conversion of carbon to oxides takes place during the residence time in the gasification zone of the gasifier. To properly feed such a slurry into the gasification zone, the slurry must be conveyed from the point at which it is generated to the gasifier. The slurry must not be too viscous to be pumped from its starting point to its destination but, simultaneously, cannot be diluted to a level that will cause incomplete or inefficient conversion to gas in a gasifier. The total water content of the slurry must therefore be kept, preferably, close to 30–40%.

This restriction on the water content of a coal-water slurry is readily attained by using high-rank solid coal sources such as anthracite and bituminous coal. However, many coal sources contain varying amounts of inherent water, and in many instances the water content may be as high as 30 weight percent; it may be higher in the case of lower rank coals such as sub-bituminous coal, lignite, and brown coal. The water is present as surface water on the face of the coal, as inherent water found in the smaller pores of the coal, and as chemically bound water within the carbon lattice. This higher water content has made these fuel sources largely useless for the production of a slurry feedstock for a gasifier.

Different approaches have been taken to render these low-rank coals useful as a feedstock for the coal gasification process. For example, the coal may be dried at an elevated temperature. The drying process successfully removes surface and inherent water but is typically incomplete, or too energy intensive, to economically remove chemically bound water in the low-rank coals. Moreover, such dried coals, when formed into a slurry, tend to take up a significant amount of water from the slurry. Mixing of lower-rank coals with a smaller percentage of finely ground, higher-rank coals has also been used to make a less costly fuel although the improvement in cost is minor after providing the means necessary to precisely grind and mix the higher- and lower-rank coals.

Other methods have focused on various chemical treatments to decrease the water content of the coal slurry and thereby boost the (British thermal unit) value of the slurry. Chemicals such as surfactants, detergents, suspension stabilizers, and amines have been used as additives to the slurry to decrease the viscosity, thereby lowering the water content necessary to maintain the pumpability. This effectively increases the concentration of the coal in the slurry, thereby raising the Btu value. Unfortunately, the addition of these chemicals is often expensive and the chemicals themselves can further decrease the efficiency of the gasification process.

U.S. Pat. No. 3,996,026 teaches a method of using organic liquids as additives to the coal-water slurry, which can then be successfully pumped from the source of the slurry to the gasifier. Immediately prior to entering the gasifier, the slurry is fed through a separator where the organic liquids are removed and the coal-water mixture is injected into the gasification zone. In this method, the coal is ground and mixed with water to form a slurry having a water content between 35 and 55% by weight. An organic liquid such as kerosene, hexane, or light vacuum gas oil is then added to the coal-water slurry to improve the pumpability. These chemicals have the added advantage of increasing the Btu value of the lower-rank coals. Unfortunately, these organic liquids are quite valuable and must be recovered, to the extent possible, before the slurry enters the gasifier. For this reason, the slurry is pumped through the machinery to a modified gasifier having a distillation apparatus that recovers the expensive organic chemicals from the slurry before the slurry is added to the gasifier. The organic liquids are removed from the slurry as a super-critical liquid or dense gas and recycled to once again act as an aid to the pumping of the coal-water mixture. The method is limited to organic liquids ranging from four to twenty carbons in length so that they can be successfully removed in the separator before the coal is injected into the gasifier. The method suffers from the greatly increased costs of running the distillation apparatus to recover the expensive organic liquid from the coal-water slurry, as well as the costs associated with continual losses of the expensive organics resulting from incomplete removal from the coal.

Therefore, there still exists a need for an improved method of preparing a feedstock for a coal gasifier that allows the use of lower-rank coals in an economically feasible manner. The method should result in a feedstock having a sufficient Btu value and a restricted water content to ensure economically efficient conversion to a synthesis gas. Preferably, the feedstock should be capable of being conveyed to the gasifier by a means that allows control over the amount and rate of solid fuel entering the gas generator while avoiding potential backflash.

SUMMARY OF THE INVENTION

The present invention is a method of beneficiating low-rank coal to produce a relatively high-energy, cohesive, low-moisture, stable feedstock for coal gasification. One embodiment of the invention comprises contacting partially or completely dried low-rank coal with wax at defined temperatures and pressures, thereby forming a wax-impregnated coal. The wax-impregnated coal may be either slurried or formed into briquettes for coal gasification. Gasification produces synthesis gas that can be used to co-produce electricity and liquified Fischer-Tropsch products, including diesel fuel, naptha, and wax. A fraction of the wax can then be recycled to the coal preparation section to aid in materials handling, agglomeration, reducing moisture levels, and increasing the specific energy of the feedstock operation.

DETAILED DESCRIPTION OF THE INVENTION

Figure 1:
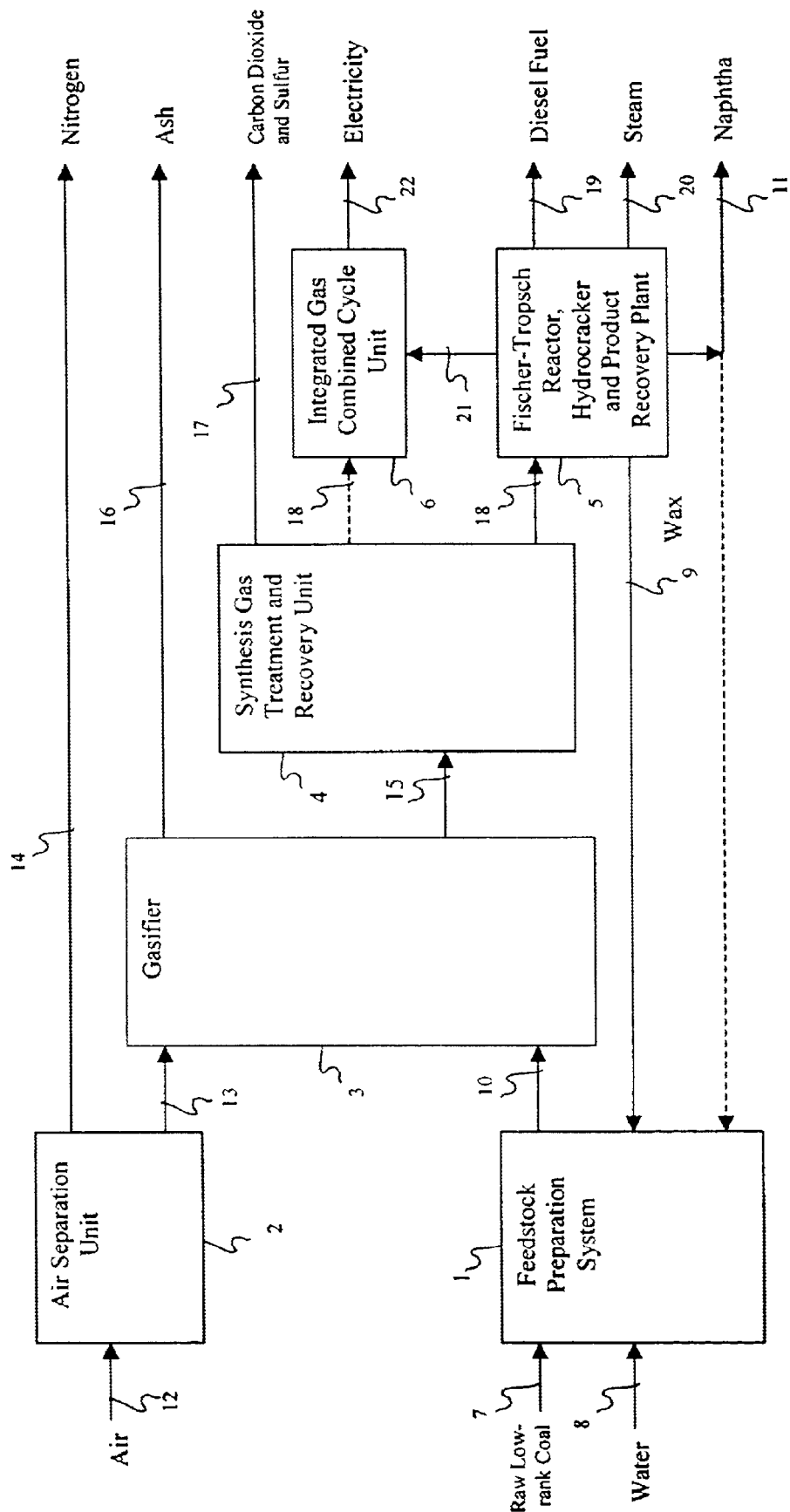
FIG. 1 shows a schematic of a coal gasification system operated in conjunction with a Fischer-Tropsch reactor and an IGCC (Integrated Gasification/Combined-Cycle) gas turbine unit.

There is an enormous amount of coal available as an energy supply. Indeed, it is estimated that world wide there is more energy available in coal than in petroleum, natural gas, and oil shale combined. Coal is a useful energy source for gasification. High-grade coals have historically been preferred because of their high energy content, which makes the gasification process economically attractive. Considerable lower-grade coal reserves exist, which have a higher water content and lower energy content. Therefore, one embodiment of the present invention provides a new method of producing a feedstock for coal gasification in which low-rank coals are mixed with a wax that has been heated to a temperature above its melting temperature to form a wax-impregnated feedstock. The wax-impregnated coal is then introduced as briquettes to a fixed-bed gasifier or as a slurry to a conventional gasifier. This method of preparing a feedstock has the advantage of increasing the energy content of the coal prior to introduction into the gasifier. The energy content is increased two ways. First, the wax reduces the amount of water necessary to produce a pumpable slurry. Second, the relatively high energy content of the wax (typically greater than 19,000 Btu/lb) increases the overall energy content of the feedstock.

Low-rank coals generally have an energy content of less than 7,000 Btu/lb, making them unattractive as a feedstock for conversion to synthesis gas via gasification using conventional technology. While the present invention is useful with any type of coal, it is particularly beneficial with low-rank coals such as sub-bituminous, lignite, and brown coal.

One aspect of the present invention involves mixing coal with a wax. Waxes are relatively heavy paraffinic hydrocarbon compounds, typically having a carbon number in excess of twenty. These waxes exist as solids at ambient temperatures. Preferred waxes for the present invention include waxes produced within the mixture of paraffinic hydrocarbon compounds produced in the conversion of hydrogen and carbon monoxide on a powdered catalyst to liquid hydrocarbons (the Fischer-Tropsch reaction described below). The wax formed by the Fischer-Tropsch reactor is a polymethylene-type wax formed by the polymerization of carbon monoxide. The Fischer-Tropsch wax typically has a melting point ranging from 45° C. to 104° C. The hydrocarbons drawn from a Fischer-Tropsch reactor must be maintained above the wax melting temperature to prevent solidification of the wax, which results in a heavy solid that fouls and plugs the separation and transport machinery. This is an energy-intensive solution, and therefore it is imperative to use the wax near its source to prevent its transport from becoming prohibitively expensive. Depending on the catalyst and the Fischer-Tropsch reaction conditions, the liquid hydrocarbon phase drawn from a Fischer-Tropsch reactor typically has a composition resembling a highly paraffinic crude oil containing, for example, ranges of 10 to 40% naphtha, 20 to 40% distillate, and 20 to 60% wax compounds by volume. The naphtha recovered in this process may be mixed with or separated from the wax.

The temperature required for contacting or mixing the wax with the coal is a temperature sufficient to maintain the wax in a liquid state. The temperature should be at least about 5° C. greater than the temperature at which a significant portion of the heavier paraffinic wax compounds solidify. For the preferred wax generated in the Fischer-Tropsch reaction, this temperature is above about 100° C. Preferably, the temperature is maintained above about about 110° C., and more preferably the temperature is maintained between about 120° C. and about 140° C.

The wax-impregnated coal feedstock is produced by contacting the liquid wax with the coal. Preferably, the coal is thoroughly mixed with the melted wax so that individual coal particles or coal fines are coated with the wax. The wax becomes absorbed in pores of the coal through hydrophobic interactions, thereby displacing any water present. In addition to boosting the energy content of the coal, the wax prevents re-absorption of water by the coal after drying. Excess water in the coal feedstock, beyond the water necessary to form a pumpable slurry, is deleterious because of the high heat of vaporization of water, which is about 1,000 Btu/lb. The presence of excess water may cause incomplete or inefficient conversion of the feedstock to gas in the gasifier. The wax has a heat of vaporization of about 150 Btu/lb and therefore does not significantly decrease the efficiency of conversion of the feedstock in the gasifier. Thus, the incorporation of wax into the coal to form a feedstock acts to boost the energy content of the feedstock while excluding excess water that can decrease the efficiency of the gasification process.

The amount of wax to be mixed with the coal is determined in part by the composition of the coal used in forming the feedstock. For example, lower-rank, high-water content coals may need to be combined with higher amounts of wax to sufficiently boost the energy content of the wax to a suitable level for use in the gasification process. Indeed, as discussed below, some low-rank coals may have a water content requiring the use of drying methods to remove some water prior to combining with the wax. Typically, wax is combined with the coal in a wax-to-coal ratio (by weight) of about 1:7 to about 1:13. Preferably, the wax is combined with the coal in a wax-to-coal ratio of about 1:8 to about 1:12, and more preferably is combined in a wax-to-coal ratio of about 1:9 to about 1:11.

The wax-impregnated coal feedstock can be produced by a number of suitable mixing methods known in the art, including those described below. The wax and coal can be combined by physical admixture. For example, the wax can be milled with the coal in a pug mill to blend the coal and the wax to the desired degree or consistency. For this operation, the wax and coal are combined and gently mixed or kneaded at the desired ratio in a pug mill maintained at a temperature above the melting point of the wax. Typically the temperature is maintained in a range between about 5° C. and about 30° C. greater than the melting point of the wax.

The wax and coal may also be combined by briquetting the coal in the presence of a wax under increased temperature and pressure. For example, in suitable briquetting operations, the mixed coal and wax are subjected to temperatures between about 5° C. and about 30° C. greater than the melting point of the wax, more preferably between about 8° C. and about 20° C. greater than the melting point of the wax, and most preferably between about 10° C. and about 15° C. greater than the melting point of the wax. Mixtures of coal and wax can also be subjected to pressures between about 2,000 psi and about 14,000 psi, more preferably between about 5,000 psi and about 12,000 psi, and most preferably between about 8,000 psi and about 11,000 psi for briquetting.

The wax may also be combined with the coal in an autoclave. This process serves to maintain the wax in a liquid form and allows for a partial purification of the low-rank or other coals. The coal can be autoclaved initially to drive off excess water, carbon dioxide, sulfur gases, or other impurities prior to mixing with the wax in the autoclave or treated initially by other means. Additionally, the coal may be partially purified and mixed with the wax in the autoclave in a single step. In suitable autoclaving operations, the mixed coal and wax are subjected to temperatures between about 90° C. and about 310° C., more preferably between about 175° C. and about 260° C., and most preferably between about 200° C. and about 230° C. The coal and wax mixtures are also subjected to pressures between about 300 psi and about 1,500 psi, and more preferably between about 400 psi and about 700 psi. Autoclaving has the advantage of producing a cleaner coal feedstock for gasification and is therefore desirable as a preliminary step when a low-rank coal source requiring purification is used.

In various embodiments of the present invention, the coal is dried before it is mixed with the wax. The drying procedures can be either active or passive. For example, if the drying is conducted in a hot, dry environment, passive drying by exposure to the environmental conditions may be sufficient. Alternatively, active drying may include subjecting the coal to heat, vacuum, or other dehumidifying conditions. The drying is typically conducted before the coal is contacted with a wax. Typically, the coal is dried to a water content of less than about 15 weight percent, preferably less than about 10 weight percent, and more preferably less than about 5 weight percent. This drying process is usually sufficient, for example, for low-rank coals that have an undesirably high water content. In instances when drying is used, the coal can be air-dried prior to impregnation with the wax, by other means such as autoclaving, briquetting, or pug milling. Drying in this manner allows for the use of coals having an initial water content in excess of 40%. Coals particularly well suited for this embodiment of the present invention have high water contents, including up to about 60%.

The synthesis gas generated by the gasification of the wax-impregnated coal can be used to generate electricity and/or be directed to a Fischer-Tropsch reactor to generate diesel fuels while recovering wax and/or naphtha for recycling to generate more wax-impregnated coal feedstock. The synthesis gas exiting the gasification operation may be cleaned first to condense water and then to remove sulfur and carbon dioxide contaminants from the gas stream from the gasifier. Such cleaning and water removal steps are conventional and well known in the art. As noted above, in one embodiment of the present invention, a portion of the cleaned gas from the gasifier is directed to a combustion turbine-generator set to produce electricity. Additionally, tail gases exiting the Fischer-Tropsch reactor can be directed to the combustion turbine-generator set to produce electricity after condensing out the liquid hydrocarbons and water. In some instances, it is also desirable to use the naphtha produced in the Fischer-Tropsch reactor as fuel for the gas turbine. The present invention involves any process suitable for combustion of a synthesis gas to produce electricity and Fischer-Tropsch liquids. For example, a preferred process for electricity generation is an IGCC process. In the IGCC technology, the hot combustion gases exiting the gas turbine are fed to a boiler to generate steam, which is fed to a steam turbine-generator set to produce additional electrical power. IGCC technology utilizing waste heat from the Brayton cycle to provide energy to a Rankine cycle is well known and provides efficient, clean, and low-cost energy. Additional energy in the form of steam can be obtained from cooling the gases exiting the gasifier, from cooling the gases exiting the Fischer-Tropsch reactor, and from removing the heat generated within the Fischer-Tropsch reactor to maintain a constant temperature. This steam can be used within the plant as steam or in a steam turbine for power generation. In another embodiment of the present invention, the gas from the gasifier is directed to a Fischer-Tropsch reactor to produce diesel fuel, naphtha, and wax. In this process, the synthesis gas is reacted in a slurry reactor on a powdered catalyst to form liquid hydrocarbons and waxes. The Fischer-Tropsch process is described in U.S. Pat. Nos. 5,324,335; 5,500,449; 5,504,118; 5,506,272; 5,543,437; 5,620,670; 5,621,155; 5,645,613; 5,763,716; and 6,068,760, which are incorporated herein by reference. The product stream from the reactor contains naphtha, diesel fuel, and waxes. The slurry is maintained in the reactor at a constant level by continuously or intermittently removing wax from the reactor while separating the catalyst from the removed wax and returning the catalyst to the reactor. This wax can then be collected and used as a wax source for the formation of a wax-impregnated coal feedstock for gasification. The diesel fuel product can be collected and sold as an end product.

By monitoring the production of the synthesis gas and the need for electricity, diesel fuel, and additional wax, the synthesis gas can be diverted to electricity production, to the Fischer-Tropsch process reaction, or split between the two processes. For example, in some areas of the world the price of electricity fluctuates significantly between peak and off-peak times. In view of such price fluctuations, the present invention includes a method to regulate the proportion of synthesis gas that is dedicated to electricity generation and to the Fischer-Tropsch reaction. The price of electricity is monitored and the synthesis gas is controlled to divert more gas into electricity generation when the price of electricity is sufficiently high to make the combustion of the synthesis gas economically more favorable than the production of diesel fuel, naptha, and wax. Alternatively, when the price of electricity drops below this level, the synthesis gas can be diverted more to the production of diesel fuel, wax, and naphtha. As the price of electricity fluctuates between these points, the synthesis gas can be split between the electricity generation and the Fischer-Tropsch processes. In this way, the price of electricity can be used to determine how to split the use of the synthesis gas. It should be recognized, however, that even at periods of peak electricity demand, there is a need to maintain some production of wax from the Fischer-Tropsch process for mixing with the coal. Similarly, at times of off-peak electricity demand, it may be beneficial to maintain some production of electricity to maintain continuous operation of the electricity generation facility.

It is also possible to use other products generated in the Fischer-Tropsch process to generate electricity. For example, the naphtha and diesel fuel products can be combusted to produce electricity in addition to the electricity generated by the combustion of the synthesis gas. Additionally, the Fischer-Tropsch reaction gives rise to a tail gas that can be captured and diverted to electricity generation. The tail gas comprises nitrogen, carbon monoxide, hydrogen, water vapor, and hydrocarbons. This tail gas can also be diverted to the production of electricity by burning the hydrocarbons. Optionally, the tail gas can be purified to remove carbon dioxide, nitrogen, or other components present from the hydrocarbons prior to diverting the tail gas to electricity generation, in an IGCC unit for example. This use of the naphtha, diesel fuel, and tail gas to produce electricity is useful when the price of electricity fluctuates to its higher levels, making the electricity economically more valuable than storing the energy in the form of diesel fuel and naphtha. Thus, at times of high electricity prices, it will be economically desirable to divert the products of the Fischer-Tropsch reaction, including naphtha, diesel fuel, and tail gas, to electricity generation while the wax is continuously recycled to the feedstock for the gasifier. When the price of electricity falls, the products of the Fischer-Tropsch reactor may become more valuable and the synthesis gas may be diverted to the Fischer-Tropsch reactor to produce diesel fuel and naphtha, and wax for use in the coal feedstock.

In addition to mixing wax with the coal to form the wax-impregnated coal feedstock, the naphtha generated by the Fischer-Tropsch reaction may also be added to the coal, further boosting the energy content of the coal feedstock. This is the preferable use of the naphtha when the price of electricity falls below the point where it is economically efficient to divert the naphtha to combustion for electricity production.

Another aspect of the present invention provides the compositions described above, including a wax-impregnated coal. Typically, wax is combined with the coal in a wax-to-coal ratio of about 1:7 to about 1:13. Preferably the wax is combined with the coal in a wax-to-coal ratio of about 1:8 to about 1:12, and more preferably is combined in a wax-to-coal ratio of about 1:9 to about 1:11. Preferably, the wax used to produce the wax-impregnated coal is the product of a Fischer-Tropsch reactor.

The coal gasification system can be operated in conjunction with a Fischer-Tropsch reactor and IGCC unit as shown in FIG. 1. The principle unit operations are the feedstock preparation system (1), air-separation unit (2), gasifier (3), synthesis gas treatment and recovery unit (4), Fischer-Tropsch reactor, hydrocracker and product recovery plant (5), and IGCC unit (6).

Raw low-rank coal (7) feeds the feedstock preparation system (1). Water (8) feeds the system as necessary. Wax (9) produced by the plant (5) is mixed with the coal to form a wax-impregnated gasifier feedstock (10). Naphtha (11) produced by the plant (5) may be optionally mixed with the wax-impregnated feedstock (10) to increase the specific energy of the feedstock.

Air (12) feeds a air separation unit (2) to provide oxygen (13) for the gasifier (3). The by-product nitrogen (14) may be sold or used by other unit operations shown in FIG. 1.

Wax-impregnated feedstock (10) and oxygen (13) feed the gasifier (3) producing raw synthesis gas (15) and ash (16). Ash may be sold as a building material or sent to landfill for final disposal.

Raw synthesis gas (15) feeds a synthesis gas treatment and recovery unit (4) producing sulfur, and carbon dioxide (17), and clean synthesis gas (18).

Clean synthesis gas (18) normally feeds the Fischer-Tropsch reactor, hydrocracker and product recovery plant (5). Optionally, the clean synthesis gas (18) may be burned by the IGCC unit to produce electricity (22) when the value of electrical energy is high or when the demand for diesel fuel is low.

The Fischer-Tropsch reactor, hydrocracker and product recovery plant (5) produces distillate fuels including diesel fuel (19), wax (9), naphtha (11), steam (20), and tail gas (21).

Tail gas (21) is burnt by the IGCC unit (6) to produce electricity (22).

Figure 2:
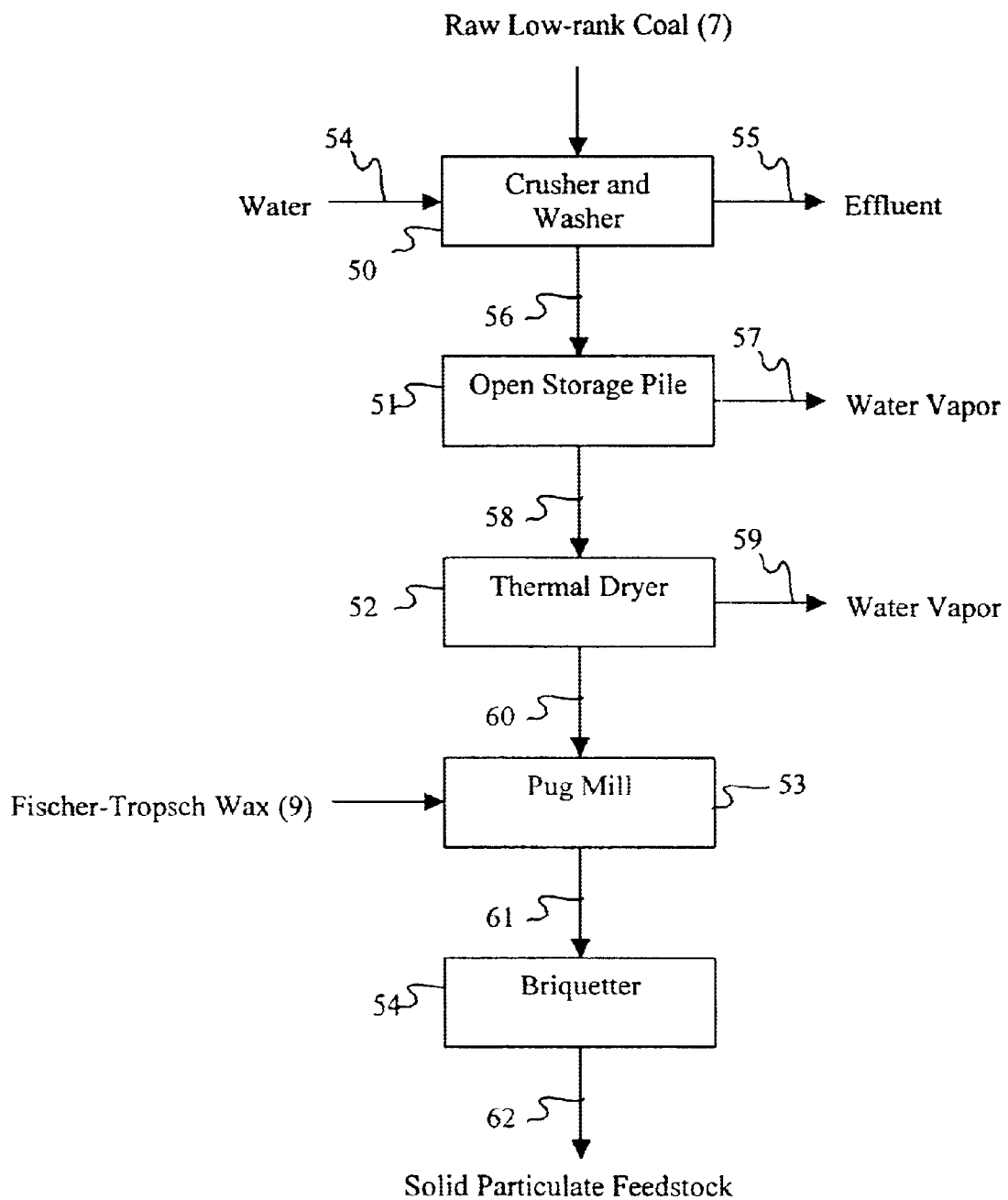
FIG. 2 shows a schematic of a method of preparing a wax-impregnated coal feedstock for a fixed-bed gasifier.

A feedstock preparation system used to provide wax-impregnated solid particulate feedstock for a fixed-bed gasifier is shown in FIG. 2. The principle unit operations are a crusher and washer (50 open storage pile (51) thermal dryer (52), pug mill (53), and briquetter (54).

Raw low-rank coal (7) is crushed to the desired top size and washed by the crusher and washer (50) and stored for a pre-determined time in open storage pile (51). Effluent containing soluble ash (55) is discarded. The crushed and washed coal (56) is partially dried while in storage, releasing water vapor (57) that reports to the atmosphere. Partially dried raw coal (58) is dried to a lower moisture level by the thermal dryer (52), releasing water vapor (59). Hot, dried product (60) is mixed with wax (9) produced by the Fischer-Tropsch reactor and product recovery plant (reference FIG. 1, item 5). The temperature of the thermal dryer product and wax is maintained at a predetermined level to melt the wax to form a wax-impregnated product (61).

The wax-impregnated product (61) is compressed by the briquetter (54) to form a stable, durable, particulate feedstock (62) for a fixed-bed gasifier.

Figure 3:
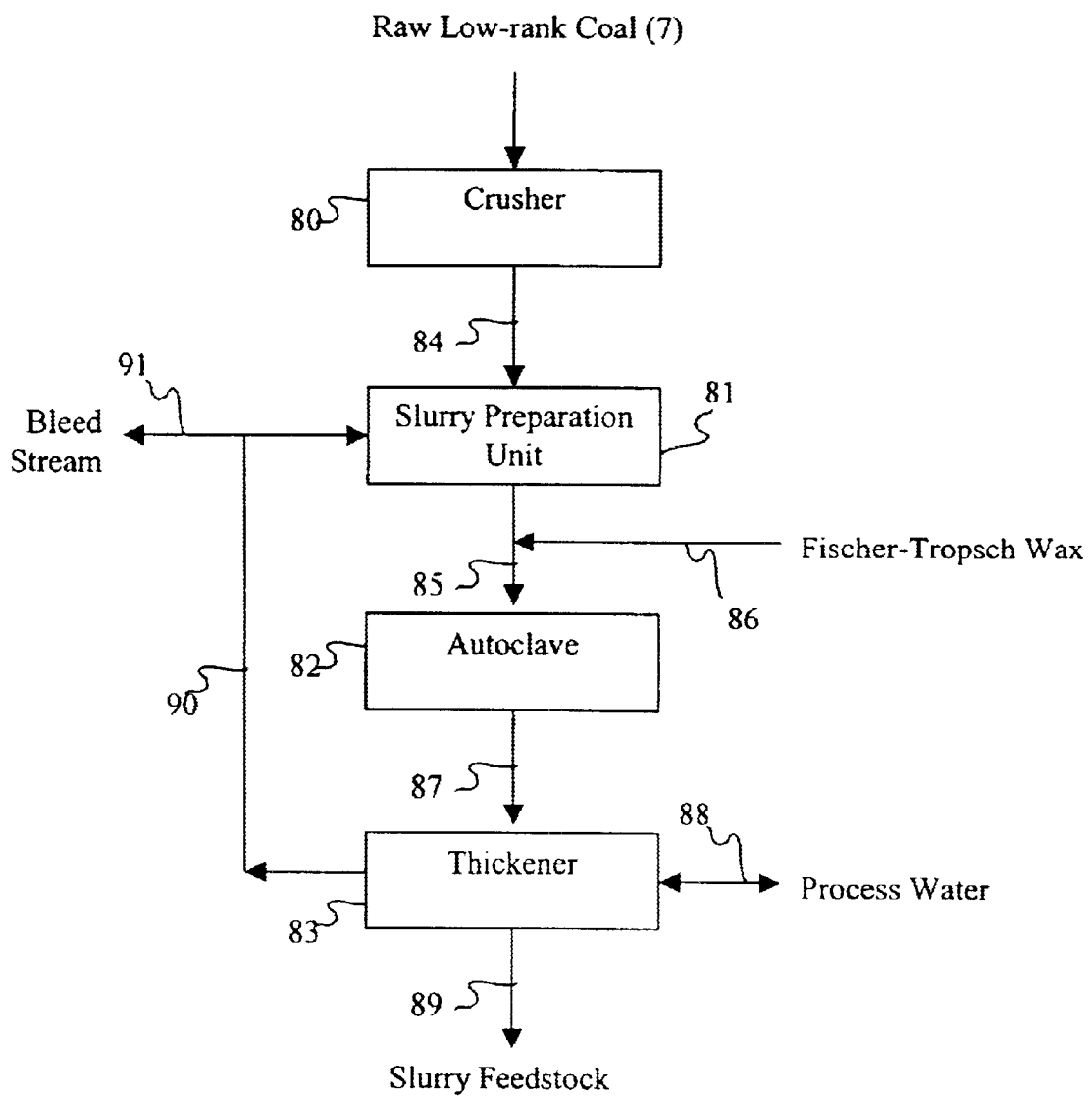
FIG. 3 shows a schematic of another method of preparing a wax-impregnated coal feedstock for a slurry-fed gasifier.

A feedstock preparation system used to provide wax-impregnated slurry feedstock for a conventional gasifier is shown in FIG. 3. The principle unit operations are a crusher (1), slurry preparation unit (2), autoclave (3), and thickener (4).

Raw low-rank coal (7) is crushed to the desired top size by the crusher (80). The crushed coal (84) feeds the slurry preparation unit (81). Wax (86) produced by the Fischer-Tropsch reactor and product recovery plant (reference FIG. 1, item 5) and clarified process water (90) feed the slurry preparation unit and are mixed with the crushed coal (84).

The wax, coal, and water slurry (85) is pumped under pressure to an autoclave (82). The autoclave conditions maintain the slurry at the desired temperature and pressure for sufficient time to release a portion of the inherent moisture, carbon dioxide, and sulfur-containing compounds. The product (87) feeds a thickener (83) to separate a portion of the water from the solids. The thickener is operated to produce clarified process water (90) and a high-solids concentration slurry feedstock (89) for a conventional slurry-fed gasifier. A water balance is maintained by releasing or adding water (88) to the circuit as necessary. A separate bleed stream containing soluble ash (91) is diverted from the clarified process water (90) to limit the concentration of dissolved solids.

What is claimed is:

1. A method of producing a feedstock for coal gasification, comprising:
    a) contacting coal with a Fischer-Tropsch wax at a temperature between about 5° C. and about 30° C. greater than the melting point of said Fischer-Tropsch wax to form a Fischer-Tropsch wax-impregnated coal; and,
    b) introducing said Fischer-Tropsch wax-impregnated coal to a coal gasification operation.

2. The method of claim 1, wherein said coal is selected from the group consisting of sub-bituminous coal, lignite, and brown coal.

3. The method of claim 1, wherein said coal has a Btu content of less than about 7,000 Btu/lb.

4. The method of claim 1, further comprising drying said coal prior to said contacting step.

5. The method of claim 4, further comprising drying said coal to less than about 15% weight percent water prior to said contacting step.

6. The method of claim 1, wherein said contacting step comprises pug milling said coal with said Fischer-Tropsch wax.

7. The method of claim 1, wherein said contacting step is conducted at a pressure between about 2,000 psi and about 14,000 psi.

8. The method of claim 1, further comprising autoclaving said coal to remove impurities prior to said contacting step.

9. The method of claim 1, wherein said contacting step comprises:
   a) autoclaving said coal in the presence of said Fischer-Tropsch wax to form said Fischer-Tropsch wax-impregnated coal; and,
   b) separating water displaced from said coal from said Fischer-Tropsch wax-impregnated coal during said step of autoclaving.

10. The method of claim 9, wherein said autoclaving step is conducted at a temperature between about 90° C. and 310° C.

11. The method of claim 9 wherein said autoclaving step is conducted at a pressure between about 300 psi and about 1,500 psi.

12. The method of claim 1, wherein said step of introducing comprises: mixing said Fischer-Tropsch wax-impregnated coal with water to form a slurry feedstock for coal gasification.

13. A method for utilizing synthesis gas, comprising:
   a) contacting coal with Ficher-Tropsch wax at a temperature between about 5° C. and about 30° C. greater than the melting point of said Fischer-Tropsch wax to form a Fischer-Tropsch wax-impregnated coal,
   b) subjecting said Fischer-Tropsch wax-impregnated coal to coal gasification to produce a synthesis gas;
   c) liquefying said synthesis gas by Fischer-Tropsch synthesis to form products comprising diesel fuel and Fischer-Tropsch wax, wherein said Fischer-Tropsch wax is used in said contacting step of (a).

14. The method of claim 13, wherein a portion of said synthesis gas is combusted to generate electricity.

15. The method of claim 14, further comprising monitoring a current price of electricity and increasing the portion of said synthesis gas being combusted to generate electricity when the current price of electricity rises.

16. The method of claim 13, wherein said Fischer-Tropsch synthesis further forms naphtha.

17. The method of claim 16, wherein said naphtha is mixed with said Fischer-Tropsch wax-impregnated coal for coal gasification.

18. The method of claim 16, wherein a portion of said naphtha is combusted to generate electricity.

19. The method of claim 13, wherein said Fischer-Tropsch synthesis further forms a tail gas and a portion of said tail gas is combusted to generate electricity.

20. The method of claim 13, wherein said coal has a Btu content of less than about 7,000 Btu/lb.

21. The method of claim 13, further comprising drying said coal to less than about 15 weight percent water prior to said contacting step.

22. The method of claim 13, wherein said contacting step comprises:
   a. autoclaving said coal in the presence of said Fischer-Tropsch wax to form said Fischer-Tropsch wax-impregnated coal; and,
   b. separating water displaced from said coal during said step of autoclaving from said Fischer-Tropsch wax-impregnated coal.

23. The method of claim 13, wherein said Fischer-Tropsch wax-impregnated coal is mixed with water to form a slurry feedstock for coal gasification.

24. The method of claim 13, wherein said coal gasification is fixed bed coal gasification.

* * * * *